United States Patent
Belov et al.

(10) Patent No.: US 8,618,934 B2
(45) Date of Patent: Dec. 31, 2013

(54) AUTONOMOUS SENSING MODULE, A SYSTEM AND A METHOD OF LONG-TERM CONDITION MONITORING OF STRUCTURES

(75) Inventors: Nickolai S Belov, Los Gatos, CA (US); Olga V Belova, Los Gatos, CA (US)

(73) Assignee: Kolos International LLC, Los Gatos, CA (US)

( * ) Notice: Subject to any disclaimer, the term of this patent is extended or adjusted under 35 U.S.C. 154(b) by 903 days.

(21) Appl. No.: 12/767,779

(22) Filed: Apr. 26, 2010

(65) Prior Publication Data

US 2010/0271199 A1 Oct. 28, 2010

Related U.S. Application Data

(60) Provisional application No. 61/214,684, filed on Apr. 27, 2009.

(51) Int. Cl.
*G08B 1/08* (2006.01)
*G08B 21/00* (2006.01)
*G06K 9/00* (2006.01)
*B60R 25/10* (2013.01)
*G05F 3/06* (2006.01)

(52) U.S. Cl.
USPC ............ 340/539.3; 340/683; 340/693.4; 340/566; 340/429; 382/107; 307/151; 250/310

(58) Field of Classification Search
USPC ........... 340/539.3, 539.1, 539.26, 683, 693.4, 340/539.13, 566, 693.1, 429; 382/107; 307/151; 250/310
See application file for complete search history.

(56) References Cited

U.S. PATENT DOCUMENTS

| | | | |
|---|---|---|---|
| 6,292,108 B1 * | 9/2001 | Straser et al. | 340/870.11 |
| 7,081,693 B2 * | 7/2006 | Hamel et al. | 307/151 |
| 7,276,703 B2 * | 10/2007 | Berkcan et al. | 250/358.1 |
| 7,461,560 B2 * | 12/2008 | Arms et al. | 73/786 |
| 8,290,747 B2 * | 10/2012 | Hamel et al. | 702/187 |
| 2008/0088441 A1 * | 4/2008 | Breed | 340/539.26 |
| 2010/0090655 A1 * | 4/2010 | Keating et al. | 320/137 |

\* cited by examiner

*Primary Examiner* — Daniel Wu
*Assistant Examiner* — Mancil Littlejohn, Jr.

(57) ABSTRACT

A system and a method of long-term condition monitoring of structures are based on use of autonomous sensing modules, centers for storing and processing data and software for data analysis. An autonomous sensing module contains a set of sensors for measurements of parameters related to the condition of a monitored structure, a non-volatile memory, a wireless data transfer unit, a controller, a clock circuit, a battery, an energy harvesting device and a power management unit. The autonomous sensing module provides a very long-term (40 years or more) functionality and reliability due to both use of at least near hermetic packages for the controller, the non-volatile memory, the battery, the clock circuit and the power management unit and choosing the duration of periods when the sensing module works in active mode in such a way that the average energy consumed by the autonomous sensing module is fully compensated by the average energy harvested by the energy harvesting device.

20 Claims, 5 Drawing Sheets

AUTONOMOUS SENSING MODULE, A SYSTEM AND A METHOD OF LONG-TERM CONDITION MONITORING OF STRUCTURES

PRIORITY CLAIM

This application claims the benefit of Provisional Application No. 61/214,684, entitled "Autonomous sensing module, a system and a method of long-term monitoring of structural properties of objects", filed on Apr. 27, 2009.

BACKGROUND

1. Field of the Invention

This invention is related to systems and methods of monitoring the condition of civil infrastructure facilities, buildings and other structures, landforms, agriculture and objects of nature as well as environmental monitoring and, in particular, to the autonomous multi-sensor systems capable of functioning for a long period of time and low cost methods of collecting and analyzing data related to the condition of structures, generating and distributing summary information on the condition of the monitored structures.

2. Description of Related Art

Aging of infrastructure and changes in landforms and objects of nature caused by time and environment can result in a wide variety of dangerous and/or undesirable events, including natural disasters and large catastrophes like collapse of structures as well as smaller scale failures of man-made structures, landslides, loss of harvest due to insufficient watering of fields, etc. In many cases these events are result of insufficient information about the condition of structures, landforms, fields, etc. that people responsible for their use and/or maintenance have in their possession.

Civil infrastructure is an area where lack of information can result in large unnecessary expenditures and loss of lives. Aging of civil infrastructure is global multi-trillion dollar problem. Transportation systems (roads, highways, rail systems, ports), utilities (power, communications, water) and public facilities require ever increasing expenditures to maintain their safety, security and integrity ("Civil infrastructure. Advanced sensing technologies and advanced repair materials for the infrastructure: water systems, dams, levees, bridges, roads and highways", white paper, NIST, March 2009). Each year Federal, state, and local governments spend billions of dollars to upgrade and repair civil infrastructure structures. Federal Highway Administration budget was $41.2 billion in 2008 (U.S. Department of Transportation Fiscal Year 2009 Budget in Brief, http://www.dotgov/bib2009/htm/FHA.html). Federal and state governments spent $70 billion on highway infrastructure and about $30 billion on drinking water and wastewater infrastructure in 2008. Despite these large expenditures there are thousands of structures that require immediate attention and repair. The August 2007 collapse of the I-35W bridge in Minneapolis cost 13 lives and will cause economic losses to the city's economy that are estimated to be close to $200 million. Damaged infrastructure also has large impact on the economy. The American Society of Civil Engineers estimates that $67 billion is spent each year in USA in vehicle repairs caused by poor road conditions ("2008 Status of the nation's highways, bridges and transit conditions and performance", U.S. Department of transportation, Report to Congress, 2008. www.fhwa.dot.gov/policy/2008 cpr/pdfs/cp2008.pdf and "Report card for America's Infrastructure", American Society of Civil Engineering, 2009. http://www.infrastructurereportcard.org/sites/default/files/RC2009_full_report.pdf).

A lack of predictability of infrastructure failures is one of the major problems that has to be addressed. It is directly linked to the lack of systems for continuous condition monitoring of civil infrastructure facilities. Aging of civil infrastructure and buildings is a complex process that involves a gradual long-term degradation, wear and can be affected by episodic events like fire, earthquake, flooding, etc. Because the factors affecting the integrity and functionality of engineered structures can not be perfectly predicted, the process of their degradation must be sensed and assessed in some form. Today the most common form of assessing the integrity of a structure is visual inspection sometimes supplemented with other non-qualitative methods. However, the amount of structures that has to be inspected on a regular basis is enormous. Besides buildings, there are about 600 thousand bridges and 4 million miles of public roadway in the USA. It is estimated that about 50 percent of bridges were built before 1940 and about 25 percent of bridges are currently structurally deficient. Beyond the infrequency of inspection, the personnel-intensive inspections are, by their nature, subjective. The inefficiency of current infrastructure condition and quality assessment practices has been studied and reported. For example, in the study of principle bridge inspection methods—the National Bridge Inspection Standards (NBIS), the Federal Highway Administration concluded that the condition ratings that NBIS generates are subjective, highly variable, and not sufficiently reliable for optimal bridge management ("Reliability of visual bridge inspection," Turner-Fairbank Highway Research Center, Federal Highway Administration, March 2001. http://www.tfhrc.gov/pubrds/marapr01/bridge.htm).

Other countries face similar problems. For example, there are a number of concerns about building safety in Hong Kong where over 50,000 high-rise buildings exceeding 100 meters were built. These buildings are designed for a life cycle of only 50 years and many of them are constructed on steep slopes and reclaimed land making them especially vulnerable to storms and landslides ("Monitoring structural safety in buildings", cover story, CityU Today, October 2005, pp. 13-17). Singapore provides another example: total of 353 buildings reported to be affected by a 6.6 magnitude earthquake that occurred in Central Sumatra on Mar. 6, 2007 ("Presentation on tremor incidents", Major C. K. Yuan, Singapore Civil Defense Force, 8 Jun. 2007, http://www.childcarelink.gov.sg/cds/attachments/Tremors.pdf). In both cases condition monitoring of the buildings and components of civil infrastructure is a critical need for assessing condition and optimization of resource allocation as well as preventing failure of the structures.

Technology that could provide more quantitative data on the integrity and condition of civil infrastructure facilities and buildings and can be used in many other areas exists. It is based on use of multi-sensor systems for long-term monitoring of parameters important for functionality and safety of a monitored structure, landform, object of nature, etc. Collecting measurement data over time, analysis of individual sets of data, using accumulated historical data for establishing baselines, detecting both long-term trends and short-term changes of monitored parameters can lead to prevention of catastrophes and much better use of resources.

However, deployment and use of multi-sensor systems can be very expensive and their service life can be much shorter than the service life of a structure or other monitored object. High cost of installation is typical when sensors need to be connected to a remote power source. High cost of maintenance is typical when sensors are powered by batteries and batteries have to be replaced after a relatively short period of time, for example, one year or three years, and also when sensors used in the system are not well protected from environmental factors and can have short service life in the field. High cost of operation and, consequently, high cost of ownership is typical when a multi-sensor system does not have infrastructure to collect and process the data without human involvement. The goal of this invention is to address these problems and provide a low-cost solution for long-term monitoring with help of multi-sensor systems.

One technology that potentially can be used for long-term monitoring of a wide range of structures, landforms, agricultural fields, etc. is wireless sensor networks (WSN). Wireless sensor networks are formed by modules containing both sensors and means for wireless communication. Such modules are often called nodes. Capabilities of this technology have been demonstrated in many projects. For example, Paek et al. from University of South California successfully used a wireless sensor network, named Wisden, for structural health monitoring (SHM) on a large seismic test structure—a full scale model of an actual hospital ceiling (Paek J., Chintalapudi K., Govindan R., Caffrey J., Marsi S. "A wireless sensor network for structural health monitoring: performance and experience", The $2^{nd}$ IEEE workshop on embedded networked sensors (EMNETS '05), 2005). Fraiser and Elgamal reported a successful deployment of a WSN-based system for vibration measurements and video monitoring of two bridges near the University of San Diego in 2006 (Fraiser M., Elgamal A. "Video and motion structural monitoring framework", Proceedings of $4^{th}$ China-Japan-US Symposium on Structural Control and Monitoring, Oct. 16-17, 2006). However, all of the reported systems are not capable for autonomous work during an extended period of time—longer than few months, they do not provide a convenient interface to a user of the monitored structure and they do not have a method of data collecting and analysis that can reveal long-term trends in parameters of the monitored structures, assess their condition and make recommendations regarding maintenance, repair and replacement of the monitored structures.

Energy supply limits service life of WSN. Best portable batteries available today can power a constantly operating sensor node for only few days. Therefore, the approach assuming that nodes work for only a small period of time making measurements and transmitting data and stay in sleep mode with a very low power consumption most of the time seems to be one of the best practical approaches to development of systems for long-term monitoring of infrastructure facilities, landforms, agricultural fields, objects of nature. With this approach life of nodes can be extended up to several years ("Wireless module claims five year battery life" Electronic Design News, Apr. 7, 2009). For example, a WSN802g module developed by RF Monolithics allows for a data rate up to 2 Mb/s, has current consumption of less than 200 mA in active mode and less than 8 µA in sleep mode, typical transmission range of 50 m indoors and 250 m outdoors. In an example of monitoring civil infrastructure facilities, as a bridge or a building, one can assume that a similar module can be active once a day for 5 minutes only consuming average current of 100 mA and consuming 5 µA for the rest of the day. With these assumptions, current consumption can be evaluated as 8.5 mA*hr per day. A standard AA lithium battery with capacity of 3000 mA*hr can last only for about a year if used to power the module. Using the node less frequently, as for example, once a week can extend its life time to several years. However, it is desirable to combine more frequent monitoring sessions with much longer life time of the nodes.

Energy harvesting is a natural way to provide an additional energy to nodes and extend their service life. Many ways of energy harvesting is being explored, including harvesting of solar energy, thermal energy, mechanical energy, energy of wind, energy of radio waves, energy of radioactive particles and others. A good summary of energy harvesting methods can be found in several reviews (see, for example, Hudak N. S., Amatucci G. G. "Small-scale energy harvesting through thermoelectric, vibration, and radiofrequency power conversion", Journal of Applied Physics, 103, 101301, 2008). Several energy harvesting devices and materials for use in energy harvesting devices are commercially available as, for example, from Advanced Cerametrics Inc., Perpetuum Ltd., EnOcean Inc., Ferro Solutions Inc., Thermolife Energy Corporation, Smart Material, and some other. Unfortunately, efforts related to combining wireless sensor nodes with energy harvesting devices did not yield any wireless sensing devices capable of working for many years. There are several reasons for that. One is related to a small amount of energy produced by the energy harvesting devices and some loss of this energy due to the need for conditioning of the output voltage of energy harvesting devices to the form suitable for use by the node. The other reason is related to insufficient attention to long-term reliability of the energy harvesting devices and the nodes themselves in field conditions. This resulted in a lack of autonomous systems suitable for monitoring of structures, landforms, agricultural fields and other objects for long periods of time, as 10-15 years and longer, without maintenance.

If a monitoring system is deployed on a structure that has been constructed many years ago then the data collected by the monitoring system can reflect only current condition of the structure, which may have existing structural defects. It may be difficult to assess condition of the structure without a baseline. In most cases, a baseline can be established only as a result of collecting data for some period of time and taking into account dependence of monitored parameters on environmental factors (air temperature, humidity, temperature gradients due to structure heating by sun, wind) and human-related factors (traffic, use of structure, etc.). Although the need for taking into account environmental parameters has been recognized by people working in the area of structural health monitoring, there are no examples of implementation of algorithms taking into account dependence of structural parameters on environmental conditions in establishing a baseline for a monitored structure.

Therefore, there is a need for a technology that can provide low-cost intelligent systems and methods for condition monitoring of structures, landforms, agricultural fields, objects of nature and other objects for very long periods of time—ideally, during the whole life time of the structure. The monitoring system hardware should require minimum maintenance and ideally should work for tens of years without a need for maintenance. The monitoring system should include algorithms for establishing baselines and revealing dependence of monitored parameters on environmental factors.

Being autonomous, such systems should, with minimum or no human involvement, make measurements, collect and analyze measurement data, evaluate condition of the structures, landforms, agricultural fields, and objects of nature under monitoring and provide required data and documentation to their owners and/or companies and agencies responsible for safety, maintenance and repair. In case of sudden and/or significant change of monitored parameters, events that can affect condition of the monitored structures, landforms, agricultural fields, and objects of nature the monitoring systems should provide warnings and allow for real time remote monitoring of parameters and visual inspection of the monitored areas.

This patent application describes wireless multi-sensor systems and supporting infrastructure that can be used for a long-term monitoring of a wide range of structures, landforms, agricultural facilities and fields, for environmental monitoring and for monitoring of objects of nature collectively referred later as "monitored objects" or "objects". These terms are used later in the patent application referring to a wide variety of long-term monitoring areas.

Different sensors can be used for making periodic measurements related to status, functionality, safety and aging of a monitored object. These sensors can provide very different information that in all cases can be digitized and stored in non-volatile memory. However, the type of information can be very different. In particular, sensors of mechanical parameters—stress, strain, vibration, etc.—can provide data that can be evaluated, for example, after plotting them versus time. Image sensors and web-cameras can provide visual information; microphones can provide audio information, etc. All these types of data will be referred to as "measurement data".

Collection of measurement data sets acquired during multiple measurement sessions over a period of time that is much longer than the time between the measurement sessions is referred to as "historical data".

Although the technology can be used in a wide range of applications related to condition monitoring, the primary focus of this patent application is on the condition monitoring of structures or structural health monitoring (SHM).

SUMMARY OF THE INVENTION

The present invention discloses an autonomous sensing module for condition monitoring of objects, including structures, landforms, environmental monitoring and monitoring of agricultural facilities and fields and objects of nature. The autonomous sensing module is capable of working for a very long period of time due to harvesting energy from environment, using components and assembly methods capable of providing a very long service life for the device, and adequate protection of the components from the environment. The autonomous sensing module uses wireless communication channels for transmitting out the measurement data.

The present invention also discloses an autonomous system for condition monitoring of objects. The system includes a set of autonomous sensing modules wirelessly connected to data collectors or base stations and a set of data storing and processing centers receiving data from the base stations. The system also includes software for processing the data, evaluating magnitude of changes in the measured parameters, assessing changes in the condition of the monitored object over time and associated risks related to the structural stability and/or functionality of the object and generating alarms, warnings, regular updates on condition of the monitored object, status of the system for its condition monitoring and other required documents. The system also provides means for remote activation of the sensing modules and interactive inspection and/or making real-time measurements of parameters characterizing current conditions of the monitored object.

The present invention also discloses a method of condition monitoring of objects. The method includes steps of deploying an autonomous system for condition monitoring on an object to be monitored, collecting data from multiple autonomous sensing modules with help of base stations, transferring the data to the data storing and processing centers, processing the data, establishing baseline for the set of reference parameters, tracking dependence of reference parameters on time, evaluating trends and magnitude of changes in the reference parameters, assessing changes in the condition of the monitored object over time and associated risks related to the structural stability and/or functionality of the monitored object, generating alarms, warnings, regular summaries on condition of the monitored object and the system for condition monitoring of the monitored object and other required documents. The method also includes a step of interactive remote inspection and/or measurements of parameters of the monitored object either in case of warning or alarm issued by the system or per request of system user.

DETAILED DESCRIPTION

Autonomous Sensing Module

Figure 1:
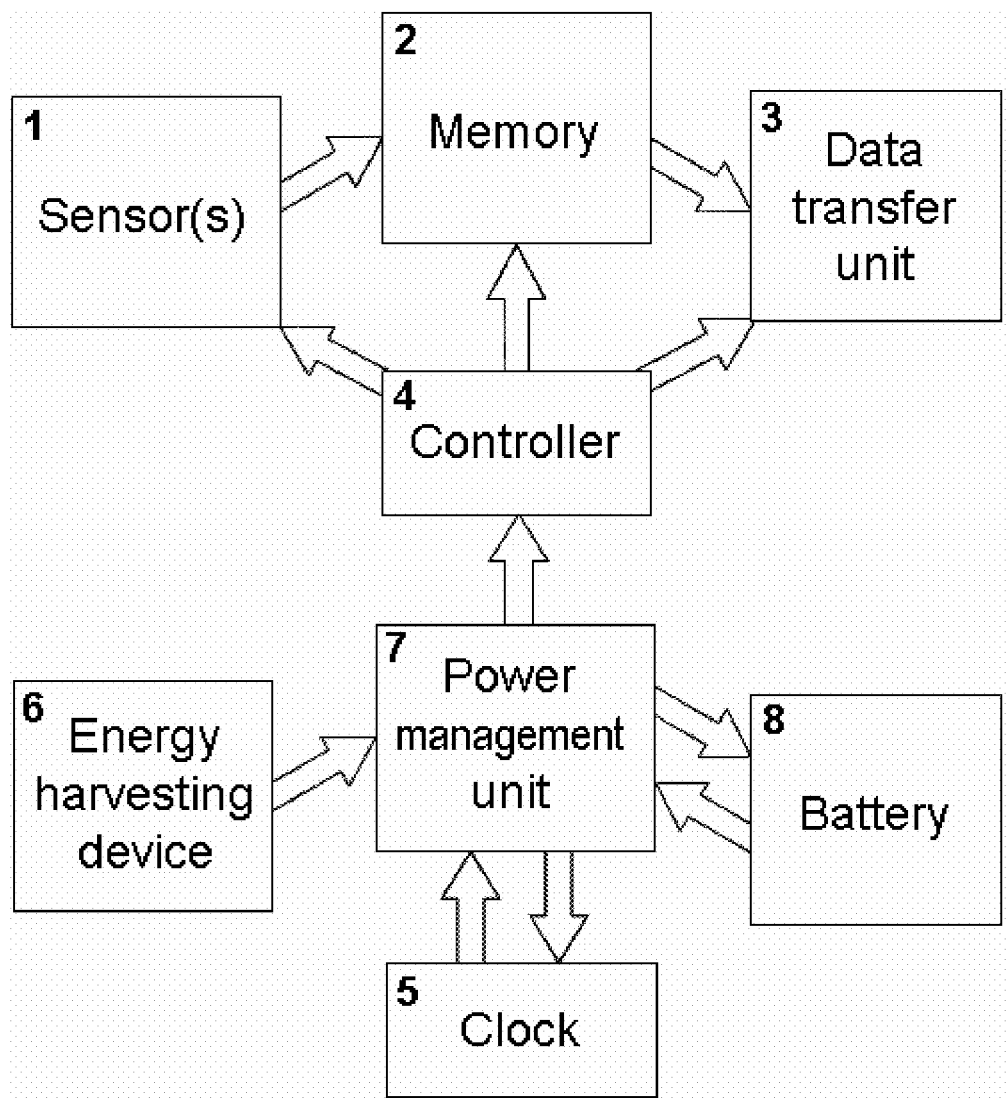
FIG. 1 shows a block diagram of an autonomous sensing module for long-term condition monitoring of a monitored object.

FIG. 1 shows a block diagram of an autonomous sensing module (ASM) for long-term condition monitoring of a structure, landform, environmental monitoring, monitoring of agricultural facilities and fields and monitoring of objects of nature. The ASM contains at least one sensor 1, a non-volatile memory 2 and a wireless data transfer unit 3—all controlled by a microcontroller 4. The microcontroller 4, the set of sensors 1, the memory 2, and the wireless data transfer unit 3 can work in two modes—active mode and sleep mode. In the active mode, the sensors 1 make measurements. If necessary, the output signals of the sensors are conditioned and digitized. In all cases the measurement data is stored in the memory 2 in digital form. From time to time the data from non-volatile memory can be transferred to the data transfer unit 3 and wirelessly transmitted to a base station (not shown in FIG. 1), which is a part of a system for long-term monitoring. Work of the ASM in active mode is referred later as a session.

In the sleep mode, the microcontroller 4, the sensors 1, the memory 2, and the wireless data transfer unit 3 do not perform measurements, data storing, processing and transmitting, correspondingly, and consume much less power and current than in the active mode. If the data transfer unit and/or microcontroller have RAM memory then it can be supported in the sleep mode. Switching from sleep mode to active mode happens by a signal from the sleep-mode clock 5. Switching from active mode to sleep mode happens either after performing all required operations in active mode ("at the end of routine") or by a signal from sleep-mode clock 5 or other clock, which operates when the ASM is in active mode. Switching to the sleep mode by a signal from clock can happen, for example, if one of the operations was not performed despite several attempts. Failure of base station to communicate despite multiple attempts to establish such communication can be an example of a situation when switching from active mode to sleep mode can be done by a signal from clock in order to keep power consumption under control. The sleep-mode clock 5 is constantly powered by battery 8 through a power management unit 7. Sleep-mode clock 5 generated a wakeup signal for switching the microcontroller 4 to active mode. After waking up the microcontroller takes control over the ASM and wake up the sensors 1, non-volatile memory 2 and data transfer unit 3 as scheduled by the software. The sensors 1, non-volatile memory 2 and data transfer unit 3 can be not powered in sleep mode. Switching from sleep mode to active mode also can be initiated by a sensor or by an external wireless signal. This can be important, for example, in case of earthquake. An accelerometer used by an ASM can wake up by a strong motion signal exceeding a preset threshold and generate a signal waking up microprocessor 4.

The energy harvesting device 6 is used to harvest energy from the environment. The harvested energy is transformed to electrical energy by this device and the output voltage is supplied to the power management unit 7. The power management unit 7 conditions the output voltage of the energy harvesting device 6 and uses the conditioned output voltage to charge the battery 8.

In order to provide a very long-term functionality and reliability of the autonomous sensing module the microcontroller 4, the non-volatile memory 2, the data transfer unit 3, the battery 8, the clock circuit 5 and the power management unit 7 are protected from the environment by placing them in one or more hermetic or near hermetic packages or enclosures.

At least a part of the energy harvesting device 6 and an antenna for wireless communications (not shown in FIG. 1) can be located outside the hermetic or near hermetic enclosure of the wireless sensing module.

Some sensors also may have a portion exposed to the ambient while the contact unit with bond pads is protected from the environment. For example, an atmospheric pressure sensor or a pressure sensor used for wind pressure measurement may have a diaphragm with piezoresistors. The back side of the die with a cavity opened to the back side of the diaphragm can be exposed to the environment while the front side of the die where both piezoresistors and bond pads are located can be facing a hermetic or near hermetic enclosure.

All electrical connections within the autonomous sensing module are, preferably, made using soldering or welding and protected by at least one layer providing a barrier for moisture and oxygen. Packaging of the autonomous sensing module can be done in inert atmosphere, getters and substances absorbing/adsorbing moisture can be added inside the package.

In order to eliminate a possibility of full battery discharge due to energy consumption in active mode and sleep mode, duration of periods when the ASM works in active mode is chosen in such a way that both the average energy consumption from the battery 8 by the ASM and battery self-discharge can be fully compensated by the average amount of energy that can be added to the battery by the power management unit 7 as a result of conditioning output voltage of the energy harvesting device 6. In other words, the energy harvesting device 6, in average, generates enough energy to fully support work of the ASM in active mode and to recharge the battery 8 compensating its discharge and/or loss of capacity over time.

Components used in the autonomous sensing module are discussed below.

Sensors

Selection of the sensors and their target parameters depend on the monitoring structure, application, and the goals of monitoring. For example, accelerometers can be used for monitoring of condition of highway bridges, automotive road bridges and buildings. In active mode accelerometers can measure single-axis, two-axis or three-axis (vector) acceleration over time. Further processing of accelerometer signals can provide information on the spectrum of oscillation modes, resonances, spectral density of the signal. All this information can be used in the data analysis. Vibration of bridges under the load of multiple running cars can be quite significant. The peak acceleration can be as high as tens of milli-g's or mg (g—free fall acceleration). For example, M. Q. Feng and Y. Chen reported peak acceleration from traffic of about 25 gals (1 gal=1 $cm/s^2$) or about 25 mg and peak acceleration from a moderate earthquake with a epicenter located about 65 miles from the bridge of about 13 gal≈13 mg (Feng M. Q., Chen Y. "Structural condition assessment of short-span RC highway bridges by ambient vibration monitoring", Bridge Research Conference, CalTrans, 2005). There are many accelerometers available in the market that can be used to measure such acceleration. For example, capacitive accelerometers manufactured by ST Microelectronics, Analog Devices, Kionix having 2 g range; piezoresistive accelerometers manufactured by Hitachi Metals also having 2 g range and other devices. Resolution of many low-g accelerometers can be as high as 1 mg and some devices have resolution in the range of 0.2-0.5 mg.

If the monitored structure is a building then it is likely to have a significantly smaller peak acceleration, which can be below 10 mg—about an order of magnitude smaller than that for bridges. More sensitive accelerometers can be used in such cases. For example, high resolution capacitive accelerometers manufactured by Colibrys can be used for vibration monitoring of buildings.

In both cases accuracy of measurements can be affected by influencing parameters as, for example, temperature. Temperature error can be comparable with the useful signal. In order to increase accuracy of acceleration measurements the autonomous sensing module can be equipped with a temperature sensor. A low-pass filter can be also used to increase signal-to-noise ratio.

In another example the structure for monitoring can be a mechanism with rotating parts, for example a rotating part of a machine, a tire, an attraction in a park, etc. Some additional sensors might be added to the set of sensors to monitor condition of such structures/objects. In particular, a gyroscope and/or an angular accelerometer can be useful. Such devices are also commercially available. For example, two-axis capacitive gyroscopes are manufactured by Invensense and ST Microelectronics.

Therefore, depending on the monitored object, application and goals of monitoring the set of sensors can contain different sensors, including a linear accelerometer, a microphone, a strain sensor, a stress sensor, a jointmeter, a pressure sensor, a temperature sensor, a force sensor, a gyroscope, an angular accelerometer, a humidity sensor, a wind sensor, a magnetic sensor, a proximity sensor, an image sensor, a web-camera, a fiber-optic sensor, an optical sensor, an acoustic sensor, a corrosion sensor, a chemical sensor, and a GPS module.

Depending on application, two or more sensors of one type can be used within one autonomous sensing module. This can be done to make multi-axis measurements, increase reliability of the autonomous sensing modules and increase accuracy of the measurements.

Sensors with both analog and digital output can be used.

Sensors can have a self test feature that can be used for verification of sensor functionality.

Sensors also can have a self calibration feature, which can be used for verification of some sensor parameters as, for example, value of initial output signal.

Non-Volatile Memory

The non-volatile memory of different types, including EEPROM and flash memory, can be used in the autonomous sensing modules. It is desirable to have enough flash memory to store all measurement data generated by all of the set of sensors within at least two active mode sessions. This can help to eliminate data loss in case of absence of communication or communication failure in one of the sessions. The EEPROM memory can store a code for the controller. This part of memory can have a size of 8-128 KB. Flash memory can be used to store measurement data.

Amount of generated data depends on the structure, application and the goals of monitoring. However, it can be estimated for some typical applications. For example, in case of monitoring of conditions of buildings the frequency spectrum for the structure is likely to be below 20 Hz. However, very quick decay of the oscillations might force using relatively high sampling rate of 100-400 Hz. In monitoring of bridges the frequency spectrum can be wider than that for buildings, but similar as for buildings data rate can be used.

If the measurements are made for 10 minutes and three channels are used (as in case of a 3D accelerometer) then 60,000 to 240,000 results can be generated. Assuming that each result fits into a 16 bit word and that the memory is capable of keeping results for two sessions, the required capacity of the memory can be evaluated as 2 Mb to 8 Mb. Similar amount of memory seems to be adequate for many other applications.

Data Transfer Unit

The data transfer unit uses a wireless channel to transmit data out to a base station. Data transmission can be done using protocols under 802.15.4 standard, which allows data transmission both within 868/915 MHz frequency bands and within 2.45 GHz frequency band with rates up to 250 kb/s. Alternatively, 802.11 family of protocols can be used, which can allow for even higher data transmission rates.

There are commercially available transmitters from Cypress Semiconductors, Texas Instruments, and other companies that can be used in data transfer modules, including previously mentioned WSN802g module developed by RF Monolithics. This module uses 802.11g protocol and provides data transfer rates up to 2 Mb/s. MC1322 family from Freescale Semiconductor is an example of 802.15.4/ZigBee compliant devices. Working in 2.4 GHz band these devices can be powered by a voltage ranging from 2.0 V to 3.6 V. Typical current consumption is below 30 mA both in receive and transmit mode. The modules have 96 KB of RAM and 128 KB of flash memory. Current consumption in hibernation mode is below 1 µA with retained 8 KB SRAM contents.

Microcontroller

Microcontroller can be built around a microprocessor, an analog-to-digital converter (ADC) IC, a digital signal processing chip or other ASIC or commercially available integrated circuit. The microcontroller can have different blocks including processor, memory, ADC, digital-to-analog converters (DAC), amplifiers, comparators, multiplexers, clock, standard ports for data exchange and other blocks.

Being in active mode, the microcontroller runs a code to perform required operations, including loading or activating a code, which can be stored in a non-volatile memory of the ASM or in a non-volatile memory or in a RAM memory of the controller itself; self-testing; establishing communications with the set of sensors and with the wireless data transfer unit; acquiring data from the set of sensors; if necessary, controlling the signal conditioning, which can include amplification, offset correction, filtering, averaging and converting the signal into digital form, adding, multiplying of signals from different sensors or different outputs of the same sensor and other operations that can be necessary for conditioning of the sensor signal; temporary storing a group of measurement results in a volatile memory; transferring the measurement data from the volatile memory to the non-volatile memory of the ASM; some data control, including data quality control; control of data transfer to the wireless data transfer unit; generating and transferring to the base station messages related to different failure modes and/or non-standard situations diagnosed either within the autonomous sensing module or through the data control.

Many controllers suitable for the autonomous sensing modules are available in the market from different companies, including Texas Instruments (digital signal processors), Cypress (PSoC family), Intel (microprocessors). Exact specs for the controller depend on application.

Sleep-Mode Clock

The sleep-mode clock circuit is constantly powered. The power consumption depends on the base frequency of the sleep-mode clock increasing with the frequency. A very low sleep-mode clock frequency can be used, thus decreasing power consumption. This circuit can consume less power than a circuit used in watches.

Energy Harvesting Device

In some cases energy harvesting device should provide average power of about 10 mW (see example of ASM power budget further in the document). For some systems a smaller amount of harvested energy (in the order of 1 mW) can be sufficient.

Harvesting energy from different ambient sources can be used, including solar radiation, mechanical energy of vibration, wind energy, thermal energy, energy of electromagnetic waves in RF range, energy of radioactive particles and some others. Not all of these sources have the same potential for energy harvesting when the 1-10 mW range of harvested power is targeted for many years of autonomous work.

Even small size solar panels are capable of providing this average level of power during a day time. However, in some applications photovoltaic elements (or a transparent protective cover for the elements) can be contaminated over time decreasing amount of harvested energy. Therefore, solar energy harvester may be less attractive for applications where the sensing module should work autonomously for many years. There are options of using such element if natural "cleaning" due to rain and wind is sufficient to keep the element effective for a very long period of time.

Harvesting of mechanical energy is also a good option. A piezoelectric wind harvester working in bending mode can be an attractive option. This type of energy harvesting device can work for a very long time. It can be designed to be protected from very large deflections, which can cause plastic deformation or other damage of its mechanical parts by a strong wind or mechanical contact between parts of the energy harvesting device and a foreign object. Such devices are available in the market. For example, Advanced Ceramterics Incorporated manufactures energy harvesting devices utilizing piezoelectric fibers having extremely long life time ("forever" according to the company). The piezoelectric harvesters utilize PZT for energy harvesting, providing a high voltage suitable for use in battery charging. Devices having output corresponding to tens of milliwatts of continuous power are available.

Energy harvesting from devices having a vibrating mass is also possible. Vibration harvesters can be more effective if the structure of monitoring experienced vibrations with frequencies above 10 Hz and, preferably, above 100 Hz because energy that can be harvested from vibrations rapidly increases with increase of frequency of vibrations. However, harvesting about 10 mW power from low frequency oscillations may require use of a relatively large mass (0.1-1.0 kg), which can be undesirable for some applications.

Thermoelectric harvesting using Seebeck effect potentially can be used in some applications. However, the Seebeck coefficient for most of materials suitable for thermoelectric harvesting is in the order of 0.2-0.3 mV/K. Taking into account that temperature difference at the working setup of the autonomous sensing module is likely to be less than 10 K, one can conclude that thousands of thermocouples should be combined in order to obtain voltages suitable for charging a battery. Therefore, suitable applications should be identified based on a potential for a large temperature gradient within the area where the monitoring device can be installed.

Radioactive energy sources also can be used to power up the autonomous sensing module.

The energy harvesting device can be located inside the package of the autonomous sensing module—this can be achieved in case of solar panel (the package can have a transparent window for the solar panel), vibration, thermoelectric harvesting devices and radioactive energy source—then the package of the autonomous sensing module allows for excellent protection of the energy harvesting device/source of energy.

In some cases the autonomous sensing module can be electrically connected to an existing energy harvesting device, as for example an existing solar panel. In such case there may be no need for an additional energy harvesting device within the ASM. In some cases it can be advantageous to separate the energy harvesting device and the autonomous sensing module in order to get both more energy and better protection for the autonomous sensing module. For example, the ASM can be protected from direct sunlight and corresponding heating and the energy harvesting device can be installed in an area of direct sunlight.

Power Management Unit

The power management unit contains interfaces with the battery and with the energy harvesting device and also provides continuous power supply to the sleep-mode clock 5 and controls power supply to the microcontroller 4. The circuit used for battery charging depends on the type of energy harvesting device. However, in all cases, the energy harvesting device can be connected to the battery through a charging circuit having an asymmetric I-V curve. If the voltage supplied by the energy harvesting device is larger than the battery voltage by a certain value, i.e. the battery can be charged, than the charging circuit has a low resistance and allow the current to flow into the battery. If the output voltage of the battery is higher or even somewhat smaller, but close to the output voltage of the energy harvesting device then the resistance of the charging circuit is high to prevent discharge of the battery. Typically the charging circuit contains also a rectifier and at least one component for temporarily storing energy, capacitor and/or inductor, and for smoothing output voltage used for battery charging. Integrated circuits and boards for charging the batteries from energy harvesting devices are known and commercially available, for example, from Linear Technology, Maxim Integrated Products and Mide Technology Corporation.

Beside, the power management unit can have a wake up circuits, which can be activated by external electromagnetic radiation using, for example, a principle used for activation of RFID components. The activation signal can be provided either by a base station or from another external source, as for example, by an inspector.

The power management unit can be integrated on a printed circuit board containing components providing all the above described functions.

Battery

The battery used in the autonomous sensing module has 25+ years of service life. There are some primary and secondary (rechargeable) batteries with 25+ years of life time ("AMR units still going strong after 25 years on their original batteries", http://www.metering.com/AMR/units/strong/after/25/years/original/batteries). Tadiran Batteries manufactures lithium batteries with a voltage of 3.6 V and capacity of 2400 mAh having self discharge of less than 1% per year. The company has customers using these batteries in devices continuously operating in the field for more than 25 years. This type of batteries can be used in ASMs that have very long periods between active mode sessions or in ASMs having both primary and secondary batteries with primary battery serving as a backup battery. In such a system the primary battery can be used only if there is not energy from the secondary battery to support the ASM in active mode.

Hoppecke FNC manufactures rechargeable NiCd batteries with 25+ years of service life. The batteries allow for more than 3000 deep discharge cycles. Rechargeable lithium batteries with 25+ years of life time are also available from Quallion LLC.

If an ASM utilizes both primary and secondary batteries then switching to a primary battery can be detected and the fact of switching can activate transmission of an alarm signal to the base station. The alarm signal can be transmitted either during every session or with other periodicity. The primary battery can support the autonomous sensing module for at least several months providing time either for maintenance or replacement of the ASM.

As it was mentioned, very different structures, landforms, etc. can be monitored with help of the ASMs. The list of objects that can be monitored includes: a building, a bridge, a wall, a roof, a floor, stairs, a power line, a pipeline, a pipe, a levee, a dam, a pier, a part of a highway, a part of a road, a part of rail road, a stadium, a tank, a well, a vehicle, an aircraft, a ship, a sea platform, a fence, a gate, a light pole, a traffic pole, a pavement, an underground structure, a historical structure, a monument, a machine, a mechanism, an attraction, a bench, a tree, a rock, an object of nature.

Place and method of installation of ASMs depends on the monitored structure, method of monitoring, application, method of energy harvesting, and climate. For example, condition monitoring of bridges and buildings with help of accelerometers can require mounting of the sensors on the structure. The autonomous sensing module can be attached to the structure using a tight mounting to eliminate parasitic vibrations related to motion of the module or the mounting accessories themselves.

However, when sound is used to monitor some properties of a structure then an ASM can be located outside the structure, in a nearby position that allows good acquisition of acoustic signals.

In another example, structure monitoring can be done by acquiring its images. In that case an ASM can be located at such a distance from the structure that allows both acquiring images of either the whole structure or a required part of the structure and providing good resolution for analysis of details of the image and for image comparison.

Method of energy harvesting and climate also has to be taken into consideration. In particular, secondary batteries can be sensitive to temperature—temperatures above 40° C. can cause rapid discharge of the secondary battery and temperatures exceeding 60° C. can cause catastrophic discharge and damage to the battery. Therefore, in some cases it makes sense to avoid installation that allows exposure of ASMs to direct sunlight. For example, attaching an ASM for bridge monitoring to a bottom deck surface can be used for protection of the module from overheating. However, this installation can limit use of the solar energy harvesting and therefore, the energy harvesting device can be exposed to direct sunlight. Similarly, a piezoelectric wind energy harvester can be installed at a place where the wind is stronger than at the place where the ASM is installed.

Similarly design and assembly of the ASMs takes into account specifics of the application and installation. In particular, if the structure is subjected to vibrations then the mounting of the components and making electrical contacts should meet requirements of reliability standards for articles subjected to vibrations during operation. Both daily temperature variations and peak temperatures during summer and winter also should be taken into account.

In general, the autonomous sensing module can be installed on the monitoring object, inside the monitoring object, outside the monitoring object, near the monitoring object, under the monitoring object, or above the monitoring object.

System for Long-Term Condition Monitoring

Figure 2:
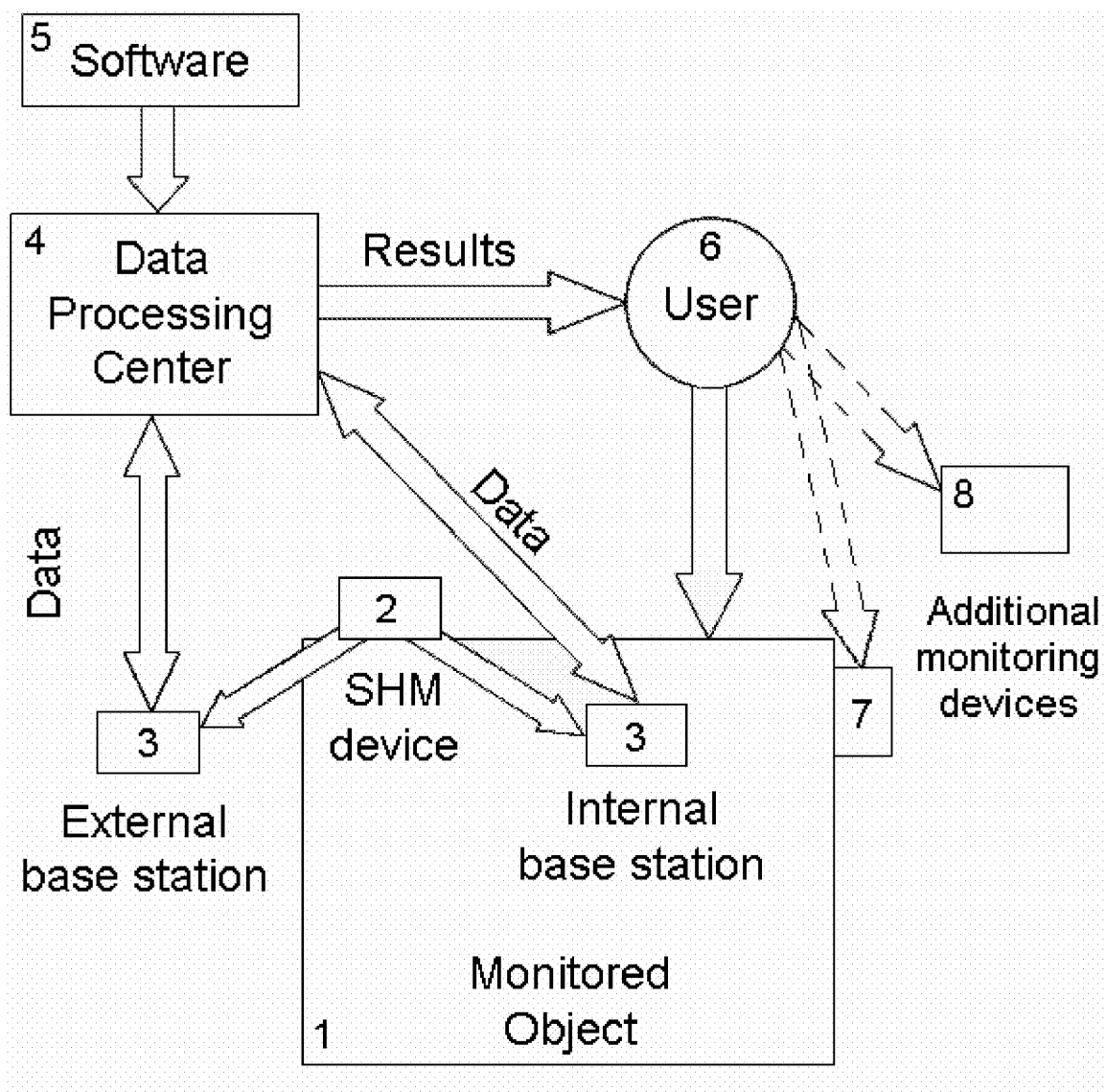
FIG. 2 shows a block diagram of a system for long-term condition monitoring of a monitored object.

FIG. 2 shows a block diagram of a system for long-term condition monitoring. The system for monitoring of an object 1 contains a set of autonomous sensing modules (ASMs) 2 and a set of base stations 3. The base stations 3 communicate with the ASMs 2 when the ASMs are in active mode and receive measurement data from them. The measurement data is transferred then from the base stations 3 to data storing and processing centers 4, where the measurement data is processed using software 5 developed for analysis of this type of data. Some summary results and recommendations are provided based on the data analysis. The summary results and recommendations are reported to some users 6 of the system 4, which can include people, companies and organizations who may have rights or interest toward the monitored objects, the data and the results of the analysis. If some infrastructure facilities are monitored then the results and recommendations can be provided to organizations responsible for maintenance of these facilities. For example, if a group of tall buildings in a downtown is monitored than the results can be provided to owners of the buildings and to corresponding city committees and departments. The users 6 make decisions and take actions regarding the monitored objects based on the provided information. The system can include some additional monitoring devices 7 and 8, which can be either installed on the monitored object 1 (as device 7) or located outside the monitored object 1 (as device 8) and can be used for real time monitoring or inspection of the object 1. For example, additional monitoring device 8 can be a web-camera and device 7 can be a backup ASM attached to the monitored object 1. If monitoring data for a remote structure suggests that some of its parameters have significantly changed then a user 6 can make a decision to inspect the monitoring object using a camera 8 and/or wake up a backup ASM 7 and make measurements using this module. Data obtained with help of some additional monitoring devices can be transferred to the data processing center and added to the set of data related to the monitored object 1.

Components used in the system for long-term monitoring of objects are discussed below.

Set of Autonomous Sensing Modules

The individual ASM has been described above. It is important to note that the system can have multiple ASMs and the modules can have the same hardware and firmware or different hardware and/or firmware. In particular, the set of sensors in the ASMs can be different. For example, one or more of the modules can have sensors of an influencing parameter (as temperature or humidity) and results of measurements can be conditioned based on the values of the influencing parameter. The set of ASMs also can have backup units, which do not work on regular basis and only tested from time to time in order to extend service life of their batteries. The backup modules can be activated remotely in case of failure of one or more normally active ASMs. Depending on the set of sensors contained in the ASMs some of them can be attached to the monitored object and some of them can be located around the monitored object. For example, accelerometers, stress and strain sensors, some chemical sensors can be attached to the monitored object while image sensors, web-cameras, microphones, some chemical sensors can be installed near the monitored object.

Base Station

The base station 3 can be located inside the monitored object 1, on its surface, outside the monitored object, above the monitored object, below the monitored object. It serves either some or all of ASMs by communicating with the sensing modules via wireless channels and receiving measurement data from them when the modules are in active mode, i.e. during sessions. Distance from the base station and the ASMs is small enough for wireless communication.

The base station is preferably connected to an electrical power line and when possible—to a data transfer channel, for example phone line or internet cable, which are often available at the monitored object. For example, buildings have electrical power lines and in many cases phone and internet lines. Most of bridges also have electrical power for street lights, etc. However, the base station can have a battery or a set of batteries as a backup or use battery as a primary power source. It also can use an energy harvesting device for recharging the battery.

The base station has a microcontroller/processor, a means for wireless communication with the ASMs, a memory that allows for storing both a program code that controls the base station and data received from ASMs during at least one session and preferably several sessions. Besides, the base station has means for communication with the data storing and processing center.

In a normal operation mode the base station can initiate communication with the set of autonomous sensing modules and use the session to control ASMs and receive measurement data from them.

During communication sessions with ASMs the base station can reset or adjust their clocks and specify time of the next session. By managing session time it is possible to influence and optimize schedule of measurements. For example, in some applications some of the sensors installed at different locations should work at the same time providing measurement data that can be synchronized. Sessions can be scheduled during different parts of the day in order to increase frequency of the monitoring sessions and collect more data.

The base station also can have means for waking up the ASMs. Different technologies, including wireless communication using one of the standard frequency bands, inductive coupling, as used for communication with RFID modules, infrared communication and others can be employed for transferring wake up signals from the base station to the ASMs. The same wake up signal can be used for all the ASMs or alternatively each module can be activated individually. The wake up option can be used, for example, after receiving a request from a data storing and processing center or a request from a user or a request from another system having authority of translating such request. The last option can be used, for example, as a response to an earthquake.

Communication between base stations and data storing and processing centers can be established by different methods, including communication via cable to allow for a very high data transfer rates; via a land phone line; through a wireless channel similar to a cell phone communication channel or using other communication options as local area networks. An internet cable communication line can be used for the first option. The third option can be used if the base station is located in the area covered by cell phone communication stations. In the first two cases the base station can directly communicate with a data storing and processing center through the internet. In the other cases the communication with the data storing and processing center can be established with an intermediate step.

Being connected either to the internet or to a wireless network supporting cell phones, the base station can receive time signals and therefore it can have very accurate local time information. Clock used by the ASMs can be less accurate and can be adjusted during wireless communication with the base stations. Besides managing clocks used by the ASMs, the base stations can assign time stamps to the sets of data transmitted by the ASMs. These time stamps are transferred together with the data to the data storing and processing centers and used in data analysis.

Data Storing and Processing Center

Data storing and processing center or data processing center is a facility that: (a) receives data from multiple base stations, (b) stores the data in databases or in other form suitable for further analysis, (c) combines data provided by the same ASM using a format convenient for data analysis; (d) combines data collected by the same base station using a format convenient for data analysis; (e) combines data collected from the same monitored objects using a format suitable for data analysis; (f) combines data for groups of similar monitored objects making them available for the comparative analysis. The data analysis can be both automated and interactive.

Software

Software is used for analysis of measurement data acquired by the set of ASMs installed on a monitored object. The analysis can be done both automatically without involvement of people and in an interactive mode. The software also has means for evaluating results of analysis and initiating verification procedures; providing warnings and alarms based on the results of analysis and/or the verification procedures. The warnings and alarms can be related to the condition of both the monitored objects and the hardware used for long-term monitoring of the objects.

The software also supports interactive activities, including inspection and taking measurements using the additional monitoring devices and/or ASMs installed on a monitored object. Based on the results of data analysis, verification procedures and interactive activities the software can assign different "credibility" ratings to different data sets, to ASMs and to base stations. The credibility ratings are taken into account in data analysis. These ratings allow for excluding bad and/or questionable data from analysis.

The software also can use existing baseline data and/or for reference data the monitored objects. In case of structures the baseline data can be provided by modeling of the structure; extracted from construction documentation or other documentation; provided by monitoring of the structure at the early stage of its life or at a predetermined age. In a general case, baseline data also can be generated by the software as a result of analysis and establishing correlation between multiple sets of data collected after the monitoring has been started. A baseline and/or reference data also can be obtained with help of the software by analyzing data for a group of similar monitored objects.

The software also generates reports for users of the system. Some algorithms of data analysis and user interface capabilities are described in the next section.

Additional Monitoring Devices

Additional monitoring devices enable real time inspection of the monitored object and/or independent measurements of some parameters related to properties of the monitored object. In particular, the additional monitoring devices can be used to inspect the monitored object or its part if the monitoring data suggest some significant changes of its properties; to verify the quality of recent measurement data by making independent measurements. Data provided by the additional monitoring devices are stored at the data storing and processing center and can be used in data analysis.

Method of Long-Term Monitoring of an Object

Figure 3:
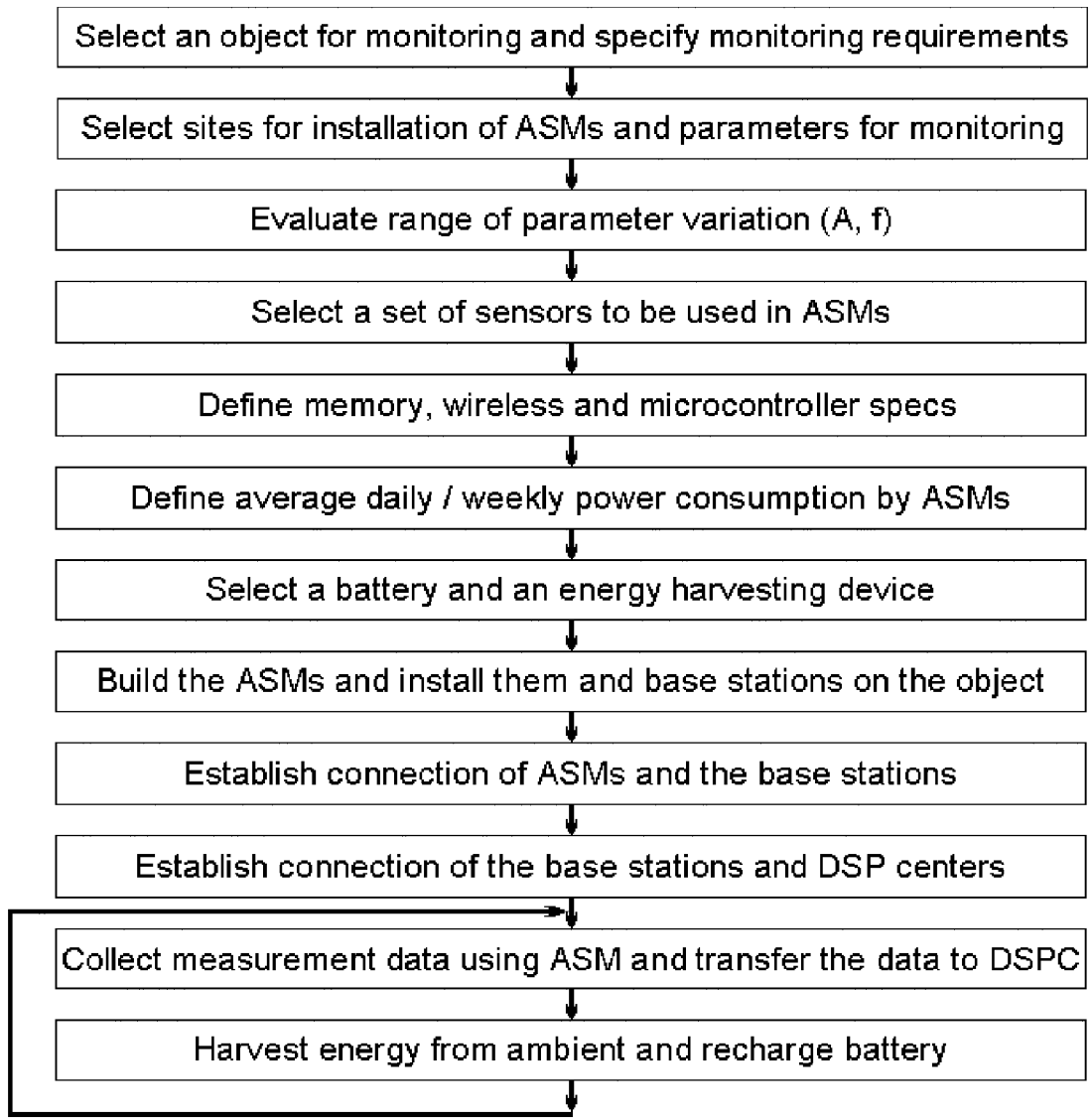
FIG. 3 shows a block diagram of an algorithm used by a method of long-term condition monitoring of a structure in the part related to designing and deploying of a system for long-term monitoring of structural properties of a structure.
Figure 4:
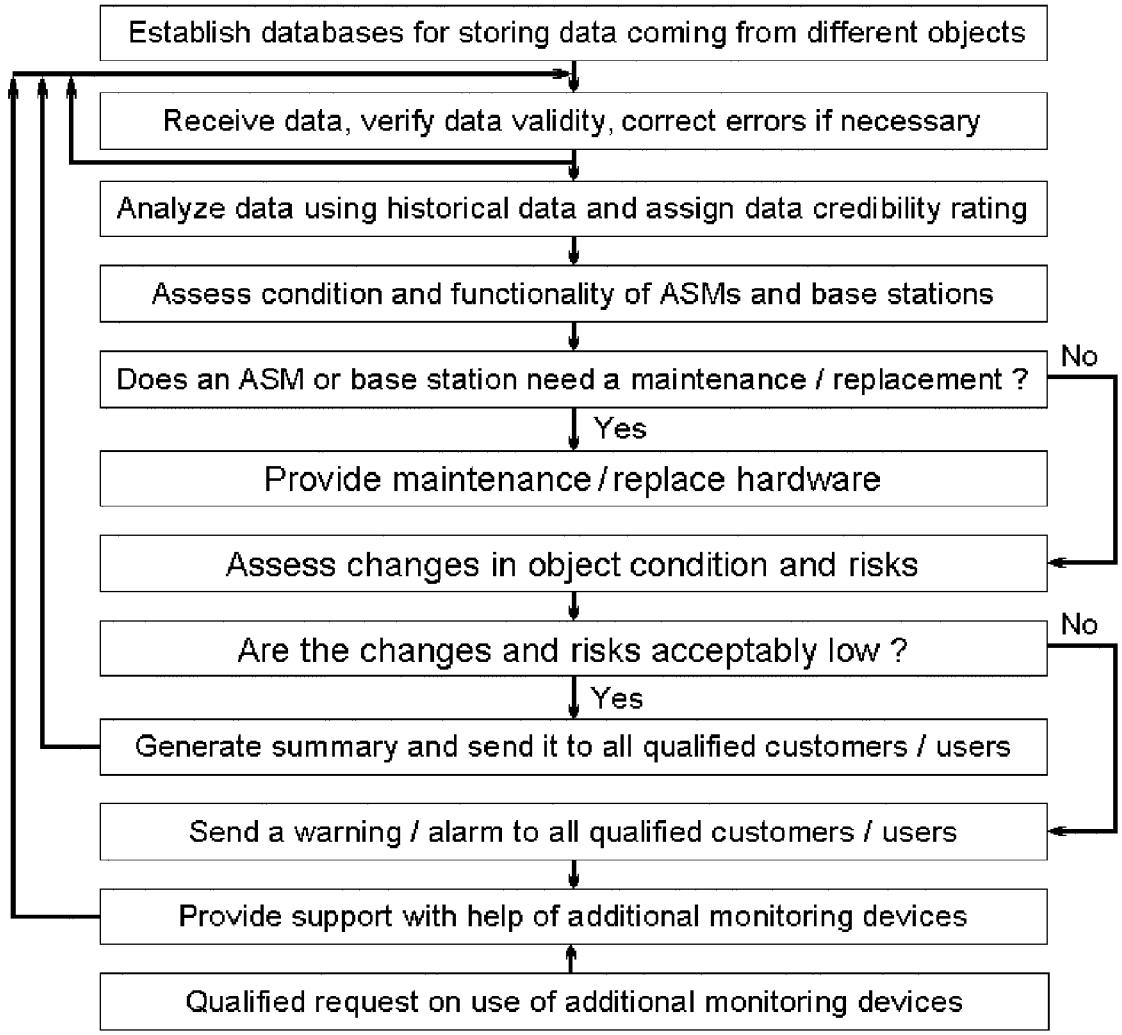
FIG. 4 shows a block diagram of an algorithm used by a method of long-term condition monitoring of a structure in the part related to collecting and analyzing the data and actions initiated as a result of the analysis.

Method of long term condition monitoring of an object is illustrated in FIG. 3 and FIG. 4.

FIG. 3 illustrates the stage of designing and deploying of a system for long-term monitoring of an object. After the object for monitoring is selected, the monitoring requirements and the set of parameters for monitoring are specified. For example, if a bridge has to be monitored then vibration and strain can be chosen as monitoring parameters. Environmental and operational parameters also can be added to the list of monitoring parameters. For example, temperature, humidity, traffic parameters can be monitored together with vibration and strain.

At the next step the object is being inspected and a number of ASMs, base stations and sites for their installation are chosen. Wireless network configuration also can be defined at this step. Preferably, a simple configuration, like star, is used where each ASM is directly connected to a base station. If necessary, a more complex network configuration with multi-hop data transmission also can be used.

Inspection and measurements on the monitored object allows for evaluation of ranges of parameter variation. In the example with the bridge used above these measurements can determine typical amplitude and a range of frequencies of bridge vibrations as well as maximum displacement of different components of the bridge. Alternatively, typical requirements for a certain class of structures can be used to determine the ranges of parameters of interest. Schedule of measurement sessions and duration of sessions also can be determined at this step. For example, a decision can be made to make three five-minute long measurement sessions per day during the first three months of monitoring to establish a baseline and then switch to once-a-week measurement schedule.

A set of sensors can be chosen based on the evaluated ranges of parameters. For example, multi-axis accelerometers can be used for vibration measurements. Strain can be measured using strain gauges. Tilt can be measured using sensitive accelerometers working as tilt sensors.

Specs for other components of the system can be defined at the next steps. The amount of data generated by the ASMs during one session can be evaluated and size of memory for storing data can be specified. Specification to microcontroller and memory can be developed next taking into account a number and type of sensors, number of measurements per second, need for signal conditioning and data management requirements. Specification to the wireless data transfer unit can be developed based on the configuration of the network used within the system, distance between the ASMs and the base stations and volume of data that can be transmitted during a session.

Specifications for sensors, memory, microcontroller, and wireless data transfer unit together with the number and duration of the sessions define the average daily/weekly power consumption by ASMs. Batteries, backup energy storage, if necessary, and energy harvesting device can be chosen based on the power consumption.

Suitable ASMs and base stations can be either selected from the hardware available on the market or designed and built based on the specifications. Both ASMs and base stations are deployed on the monitoring object after that. Connections of the ASMs with the base stations and connections of the base stations with the data storing and processing centers are established at the next step. As a result of the above described steps the system for long-term monitoring of the object is deployed and process of monitoring can be started.

The monitoring process can include periodic sessions when measurements are made and the measurement data is transferred to the base stations. Base stations transfer the data to data storing and processing centers (DSPC).

Depending on state of charge the battery can be periodically charged using energy harvested by the energy harvesting device.

FIG. 4 illustrates the stage of long-term monitoring and data analysis.

The data storing and processing centers establish databases for storing data acquired from monitoring of different monitored objects. After receiving measurement data from a monitored object, the DSPC verifies data validity. If necessary, DSPC requests data verification and correct errors. After that the data is placed in a corresponding database.

With certain periodicity, for example, once a week, once a month or per request, the data analysis software does analysis of the set of available data for each monitoring object. The analysis for each monitoring object can include: (a) analysis of the data collected after the last analysis (or current data) for each ASM; (b) analysis of current data for each base station; (c) analysis of current data for each monitored object; (d) analysis of historical data for each ASM, comparison with the current data and assigning credibility rating to data sets from the current data; (e) analysis of historical data for each base station, comparison with the current data and assigning credibility rating to data sets from the current data; (f) analysis of historical data for each monitored object, comparison with the current data and assigning credibility rating to data sets from the current data; (g) assessing changes in conditions and functionality of each ASM and each base station, making decision about using data from these units and, if necessary, providing recommendations regarding schedule of measurement sessions, maintenance or repair/replacement of some ASMs and/or base stations; (h) evaluating magnitude of changes in the measured parameters of the monitored object over time and assessing changes in its condition and associated risks related to the structural health, safety and functionality of the monitored object; (i) generating reports, warnings and alarms related to condition of the monitored objects, sending these reports, warnings and alarms to eligible parties; (j) providing access to the additional monitoring devices and interactive data analysis in case of alarms and per request of a qualified user.

A detailed description of data analysis steps is provided below for a specific example of using accelerometers for monitoring of a structure followed by a more general example.

When accelerometers are used for monitoring of a structure then data analysis for a group of one or more recently acquired (current) data sets and related actions can include the following steps:

(a) Evaluate validity of current data sets. This can be done by calculating averages and standard deviations for each sensitive direction of each accelerometer and comparing these results with historical data for the same devices and the same sensitive axes as well as comparing data for similar sensitive axes of different accelerometers.

(b) Numerically integrate measured acceleration over time and obtain a dependence of velocity versus time.

(c) Numerically integrate velocity over time and obtain dependence of displacement over time.

(d) Assuming that average displacement, average velocity and average acceleration of the structure over the period of active monitoring are equal to zero make corrections to the acceleration versus time dependency and re-calculate velocity and displacement over time dependencies. This operation can be done for each data set or selectively based on the impact that the corrections can have on the use of the data.

(e) Use Fourier transformation to obtain a spectrum of acceleration, velocity and displacement in the frequency domain for each data set.

(f) Obtain distribution of absolute values of acceleration, velocity and displacement values for each data set.

(g) Select global and local maximums for each frequency spectrum obtained on step (e) and each distribution obtained on step (f) and find average absolute value of each parameter; the resulting set of calculated parameters will include: peak and average absolute value of acceleration, peak and average absolute value of velocity, peak and average absolute value of displacement, frequencies of main oscillation modes and corresponding spectral densities; this set is used further in data analysis and referred later as a set of reference parameters or a vector of reference parameters for the current data set.

(h) Use time dependencies for acceleration, velocity and displacement for different ASMs and frequencies of main oscillation modes to identify the shapes of main oscillation modes. Some parameters characterizing shapes of main oscillation modes, as amplitudes at different locations, locations of global and local maximums and minimums, symmetry with respect to different axes and distortion with respect to some ideal shapes can be added to the vector of reference parameters for the current data sets. This step can be performed when data collected by ASMs allows for good identification of mode shapes. Good synchronization between ASMs might be needed to identify mode shapes. Such synchronization can be provided, for example, by using base station clock as a master clock and synchronizing all ASM clocks with the master clock.

(i) Use the first sets of measurement data for establishing a baseline for each ASM, each base station and for the whole structure for each of the reference parameters; the baseline can include: average value and standard deviation calculated using all data available for each parameter. In the further description of the algorithm it is assumed that the baseline is already established. The baseline does not change unless the structure or other monitoring object undergoes certain structural changes as upgrades, repairs, reconstruction, strengthening, etc. or can have experienced structural changes as a result of an event as earthquake, flooding, fire, landslide, etc. In case if the structure or monitoring object has some structural changes then a new baseline can be established using the first sets of measurements acquired after the changes had happened.

Use the first sets of measurement data for establishing time dependence of average value and standard deviation as well as moving averages for average values and for standard deviations for each reference parameter. Moving averages for both average value and standard deviation can be calculated for one or more predetermined periods of time preceding the current monitoring session. Time dependence of reference parameters is referred below as historical data for the reference parameters. In contrast with the baseline, the set of historical data is updated after accepting each new set of measurements. Acceptance criteria are described later (step l).

After the baseline is established, the safe ranges of all reference parameters are defined. This can be done with help of different approaches, including modeling of the structure, using construction documentation, using data on safe ranges specified for similar structures, expert estimate, etc.

(j) If available, use data from other sensors of influencing parameters, as for example, temperature, humidity, wind, traffic intensity and other sensors to evaluate average values of the influencing parameters and add these values as a set of influencing parameters or as a vector linked to the corresponding set of reference parameters.

In some cases the influencing parameters can be obtained from sources other than the sensors used in the system for monitoring of structural parameters of structures. For example, data about weather parameters can be available from the internet or from some other local sensing systems. Local traffic data can be collected by existing magnetic sensors.

(k) If the influencing parameters are measured or used from the other sources then the first sets of measurements can be used to establish correlations between vector of reference parameters and vector of influencing parameter. Most likely, such correlations can be found because change of temperature or gusts of wind can cause change in the stress distribution and other mechanical parameters of the structure and it can result in some change of the reference parameters; in many cases the correlation can be strong.

The same approach as was described for establishing a baseline and historical time dependence for each reference parameter can be used to establish baseline and historical time dependence for correlation of each reference parameter and each influencing parameter.

If the correlation between the reference parameters and the influencing parameters are well established then the reference parameters can be calculated for a specific set of influencing parameters called "normal conditions"; in the above mentioned example normal conditions for a bridge can include a certain temperature, humidity, wind and traffic intensity.

Using the correlations between the reference parameters and the influencing parameters the safe ranges of all reference parameters used in data analysis can be made dependent on the influencing parameters. In some cases it might be immediately evident that some combination of influencing parameters can be dangerous for the structure. For example, it can be evident that high traffic in a cold windy day can result in shifting of some reference parameters out of their safe ranges for a monitored bridge. This information can be used to prevent such dangerous situations.

(l) Compare each of the reference parameters for the current data set with the safe range and with the historical data for this parameter. If all reference parameters for the current data set are within their safe ranges and none of the parameters deviate more than allowed from the corresponding moving averages determined by historical data then the current set of data is accepted and added to the historical set of data; and the historical set of data is updated taking into account the latest data.

(m) If at least one of the reference parameters deviates more than a predetermined value from a moving average (as calculated for the real values of the influencing parameters or for the values of reference parameters recalculated for the "normal conditions") then a request for data verification can be issued by the software. For example, request for data verification can be issued if the peak acceleration in the current data set deviates from the average peak acceleration more than three average standard deviations for the historical distribution of peak acceleration. However, the questionable parameter still can be within the safe range and does not trigger any warnings or alarms.

If data verification shows that some sensors or ASMs or base stations do not work properly then depending on the adverse effect this issue may have on the system for monitoring of structural properties of the structure a recommendation, a request or an order can be issued for maintenance, repair or replacement of the malfunctioning component. If the system has some redundant ASMs or base stations then some of these components can be activated and started to be used.

(n) If at least one of the reference parameters is out of the safe range then either a warning or alarm is triggered. The fact that one of the reference parameters was found to be out of the safe range can be a result of a damage (in such case a large shift of some reference parameters can be expected) or it can be a natural result of the monitoring object aging when the historical curves move toward the limits of the safe range. In the latter case the current set of data can be accepted and added to the historical set of data.

When possible, collected current data and historical data can be used to evaluate location of the damage or location of the part of the monitoring object responsible for shifting some reference parameters out of their safe ranges as well as severity of damage and safety of the monitored object. Localization of damage can be done based on the analysis of relative changes of reference parameters for separate ASMs and correlated with locations of the ASMs. Another approach to damage localization can be related to the use of information about shapes of the oscillation modes.

After warning/alarm is triggered, either a user of the system and/or owner of the monitored structure and/or a specialist is (are) informed about the potential problem with the monitored structure. The system provides real-time access to additional monitoring devices that allows these people to inspect the structure and/or make some independent measurements and repeat the analysis.

In many cases analysis of the current data allows for detecting not only deviation of some reference parameters out of safe limits, but also a probable location of the problematic/damaged part of the structure, possible severity of the damage and evaluate how safe is the structure to use.

(o) Credibility rating is assigned to the current set of data based on the deviation of the set of reference parameters from the set of moving averages for historical reference parameters. A metric defining a distance between vectors in a space of reference parameters can be defined for evaluating of this deviation.

Credibility ratings can change over time. For example, if a structure exhibited a change of parameters the first set of data can get low credibility rating, but after the change is confirmed by subsequent measurements the credibility rating can be increased for the earlier measurement.

(p) From time to time the set of moving averages for the historical reference parameters can be compared with the baseline reference parameters and trend lines for the reference parameters can be evaluated. Based on the trend lines it can be estimated when some of the reference parameters will be approaching the safe limits. This information can be used to plan some maintenance, repair and even replacement of the monitored structure.

The above example, deals with a set of sensors utilizing accelerometers and some sensors of influencing parameters. This approach can be generalized.

A general approach that can be used in data analysis includes the following steps:

(a) Identify parameters, which are informative for evaluation of condition of a class or a group of monitored objects and can be obtained from the measured parameters by numerical integration and/or differentiation over time or by other operations, as for example multiplication or calculating ratio or sum of some measured parameters.

(b) Based on identified parameters and their variation with time during a day, a week, a season as well as annual variations, specify schedule of measurement for these parameters. Collect data according to the schedule. This data is referred later as current data sets.

(c) Evaluate validity of current data sets. This can be done by calculating averages and standard deviations for each monitored parameter and comparing these results with historical data for the same parameters as well as comparing data for similar parameters of different sensors.

(d) Fulfill required mathematical operations to obtain the identified informative parameters. In the above example the measured acceleration was used to obtain velocity and displacement.

(e) If there are known relationships related to the measured and calculated parameters then use these relationships to correct the time dependencies obtained from measurement data.

In the above example, average displacement, average velocity and average acceleration of a stationary structure over the period of active monitoring was assumed to be zero and correction of these parameters was made using this assumption.

(f) Obtain distribution of absolute values of the measured and calculated parameters (density distributions in the time domain) for each data set.

(g) If the measured and calculated parameters are changing with motion of the monitoring object or with motion of some of its parts the use Fourier transformation to obtain a spectrum of the measured and calculated parameters in the frequency domain for each data set. Otherwise go to step (j).

(h) Select global and local maximums for each frequency spectrum obtained on step (g) and each distribution obtained on step (f) and find average absolute value of each parameter; the resulting set of calculated parameters will include: peak and average values for each measured and calculated parameter, main frequencies and corresponding spectral densities in the frequency domain; this set is used further in data analysis and referred later as a set of reference parameters or a vector of reference parameters for the current data set.

(i) Use time dependencies for parameters that: (a) can have significantly different variations in different parts of the monitoring object and (b) can have correlations between time dependencies of such variations to identify reproducible spatial distributions of these parameters. Data collected by different ASMs should be used for identification of such spatial distributions. Some parameters characterizing the spatial distributions as their values at different locations, locations of global and local maximums and minimums, symmetry with respect to different axes and distortion with respect to some ideal shapes can be added to the vector of reference parameters for the current data sets. This step can be performed when data collected by ASMs allows for good identification of the spatial distributions.

In the above example, time dependencies for acceleration, velocity and displacement for different ASMs and frequencies of main oscillation modes were used to identify the shapes of main oscillation modes. Stress distribution over a monitoring object can be another example of spatial distribution of interest.

(j) Use the first sets of measurement data for establishing a baseline for each ASM, each base station and for the whole monitoring object for each of the reference parameters. The baseline can include average value and standard deviation calculated using all data available for each reference parameter. In the further description of the algorithm it is assumed that the baseline is already established. The baseline does not change unless the structure or other monitoring object undergoes certain structural changes as upgrades, repairs, reconstruction, strengthening, etc. or can have experienced structural changes as a result of an event as earthquake, flooding, fire, landslide, etc. In case if the structure or monitoring object has some structural changes then a new baseline can be established using the first sets of measurements acquired after the changes had happened.

Use the first sets of measurement data for establishing time dependence of average value and standard deviation as well as moving averages for average values and for standard deviations for each reference parameter. Moving averages for both average value and standard deviation can be calculated for one or more predetermined periods of time preceding the current monitoring session, for example 60-day moving average, 180-day moving average, 5-year moving average, etc. Time dependence of reference parameters is referred below as historical data for the reference parameters. In contrast with the baseline, the set of historical data is updated after accepting each new set of measurements. Acceptance criteria are described later (step m).

After the baseline is established, the safe ranges of reference parameters should be defined. This can be done with help of different approaches, including modeling of the monitoring object, using construction documentation for a structure, using data on safe ranges specified in similar cases, expert estimate, etc.

(k) If the system has sensors of influencing parameters then use data from these sensors to evaluate average values of the influencing parameters during the current session and add these values as a set of influencing parameters or as a vector linked to the corresponding set of current reference parameters.

The set of influencing parameters depends on the monitoring object and on application. Typical influencing parameters are temperature, wind, humidity, traffic intensity, light intensity.

In some cases the influencing parameters can be obtained from sources other than the sensors used in the monitoring system. For example, data about weather parameters or traffic parameters can be available from the internet or from other local sensing systems.

(l) If the influencing parameters are measured or obtained from the other sources then the first sets of measurements can be used to establish correlations between each reference parameter and each influencing parameter.

The same approach as was described for establishing a baseline and time dependence of historical data for each reference parameter can be used to establish correlation baseline and time dependence of historical data on correlation of each reference parameter and each influencing parameter.

If the correlation between the reference parameters and the influencing parameters is well established then the reference parameters can be calculated for a specific set of influencing parameters called "normal conditions".

Using the correlations between the reference parameters and the influencing parameters the safe ranges of all reference parameters used in data analysis can be made dependent on the influencing parameters. In some cases it might be immediately evident that some combination of influencing parameters can be dangerous for the monitoring object. This information can be used to prevent such dangerous situations.

(m) Compare each of the reference parameters for the current data set with the safe range and with the historical data for this parameter. If all reference parameters for the current data set are within the safe ranges and none of the parameters deviate more than allowed from the corresponding historical values then the current set of data is accepted and added to the historical set of data, and the historical set of data is updated taking into account the latest data.

(n) If at least one of the reference parameters deviates more than a predetermined value from a moving average (as calculated for the real values of the influencing parameters or for the values of reference parameters recalculated for the "normal conditions") then a request for data verification can be issued by the software. If this reference parameter is still within the safe range then the data verification request does not trigger any warnings or alarms.

If data verification shows that some sensors or ASMs or base stations do not work properly then depending on the adverse effect this issue may have on the monitoring system a recommendation, a request or an order can be issued for maintenance, repair or replacement of the malfunctioning component.

(o) If at least one of the reference parameters is out of the safe range then either a warning or alarm is triggered. The fact that one of the reference parameters was found to be out of the safe range can be a result of a damage (in such case a large shift of some reference parameters can be expected) or it can be a natural result of the monitoring object aging when the historical curves move toward the limits of the safe range. In the latter case the current set of data can be accepted and added to the historical set of data.

When possible, collected current data and historical data can be used to evaluate location of the damage or location of the part of the monitoring object responsible for shifting some reference parameters out of their safe ranges as well as severity of damage and safety of the monitored object. Localization of damage can be done based on the analysis of relative changes of reference parameters for separate ASMs and correlated with locations of the ASMs. Another approach to damage localization can be related to the use of information about shapes of the oscillation modes.

After warning/alarm is triggered, either a user of the system and/or owner of the monitored object and/or a specialist is (are) informed about the potential problem with the monitored object or with SHM system hardware. If necessary, the system can provide real-time access to additional monitoring devices that allows these people to inspect the monitoring object and/or make some independent measurements and repeat the analysis.

(p) Credibility rating is assigned to the current set of data for each ASM, each base station and for the monitoring object as a whole based on the deviation of the set of reference parameters from the set of moving averages for historical reference parameters. A metric defining a distance between vectors in a space of reference parameters can be defined for evaluating of this deviation.

Credibility ratings can change over time. For example, if a structure exhibited a change of parameters the first set of data can get low credibility rating, but after the change is confirmed by subsequent measurements the credibility rating can be increased for the earlier measurement.

(q) From time to time the set of moving averages for the historical reference parameters can be compared with the baseline reference parameters and trends for the reference parameters can be evaluated. Based on the trends, it can be estimated when some of the reference parameters will be approaching one of the limits of their safe range. This information can be used to plan some maintenance, repair and even replacement of the monitored structure or other actions related to the monitored object.

(r) Generate summary reports describing the set of reference parameters and trends of their change, recommendations related to maintenance, repair or replacement of the monitored structure or other actions appropriate for the monitoring object as well as recommendations related to the monitoring system.

Example of a Monitoring System Installed on a Bridge

Figure 5:
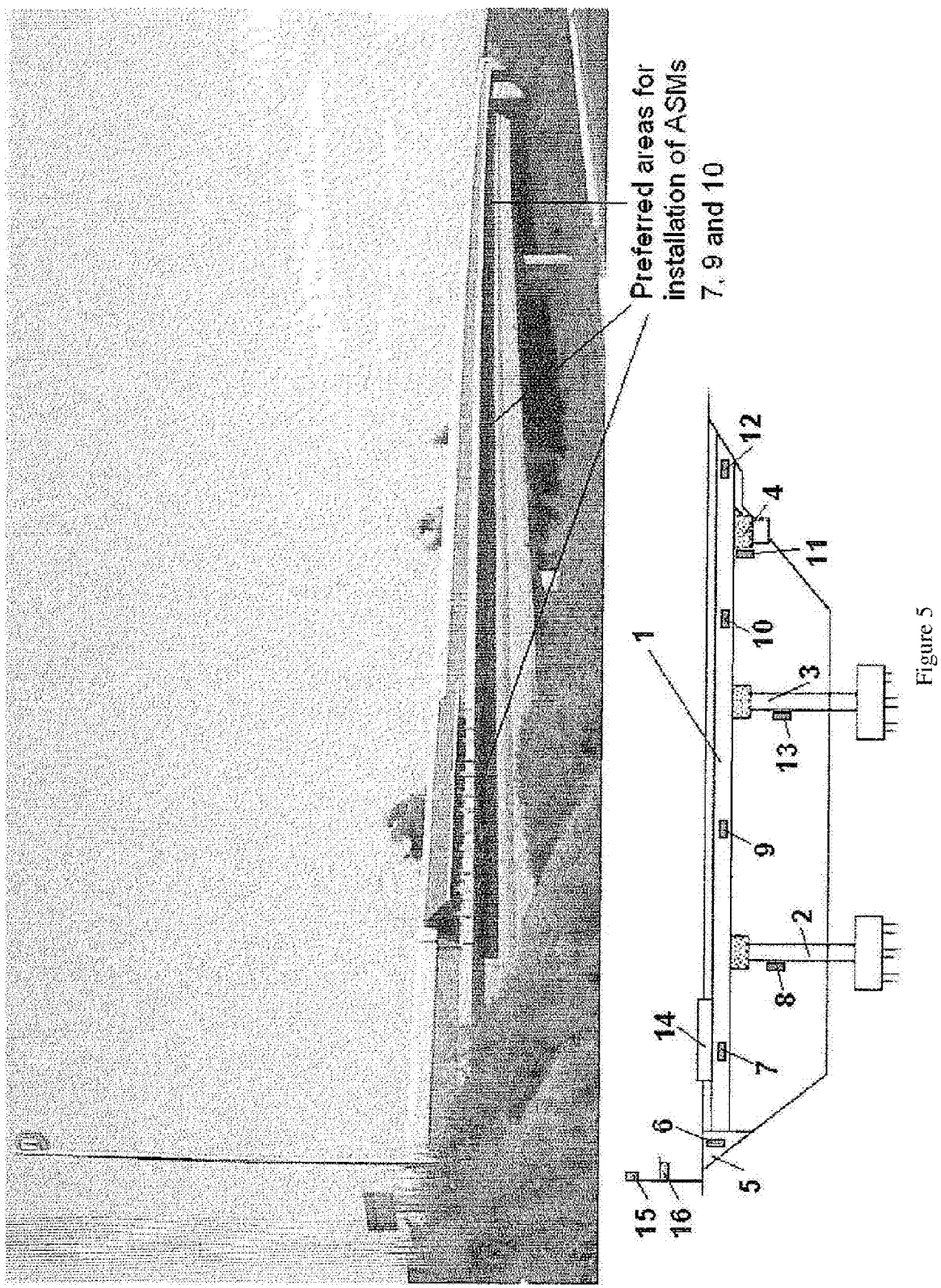
FIG. 5 shows an example of a system for long-term condition monitoring that can be deployed on a bridge.

FIG. 5 shows an example of a monitoring hardware installed on a bridge. The photo is taken from the paper of M. Q. Feng and Y. Chen cited above. The top portion of the bridge 1 is supported by the structures 2, 3, 4 and 5. These supporting structures define three spans.

Autonomous sensing modules 6-13 are installed on the bridge. The ASMs 7, 9 and 10 are installed approximately in the middle of the spans where the maximum acceleration is expected. ASMs 6, 8, 11, and 13 are installed on the supporting structures. ASMs 6 and 12 are installed at the ends of the bridge to detect vibrations related to transition between the bridge and the part of the road supported by the ground. All installed ASMs can be placed in the area not exposed to direct sunlight (may be except dawn or dusk hours) and therefore probability of modules overheating by the sunlight is minimized. It is important for minimizing discharge of the batteries. More ASMs can be installed on the bridge. In particular, several ASMs can be installed along some imaginary lines perpendicular to the longitudinal direction of the bridge and more ASMs can be installed along the bridge in order to have better capabilities in reconstruction of the bridge oscillation mode shapes. All ASMs communicate with a base station 15 installed on a post. The base station 15 has its own battery and is also connected to a relatively large solar battery 14 installed on the side of the bridge. The system also has a camera 16 powered by the same solar battery. The camera is connected to the internet through the base station 15. The camera is an additional monitoring device that can be used for inspection of the bridge. Other cameras can be installed as well. In particular, the cameras can be installed at locations that allow inspection of the supporting structures 2-5.

Some or all ASMs also can be connected to this solar battery. Some of the ASMs can have windpowered energy harvesting devices. For example, wind powered devices can be installed on the supporting structures under the bridge where they will be often exposed to wind.

All ASMs 6-13 installed on the bridge can use three-axis accelerometers. External strain sensors can be connected to some or to all of the ASMs. Beside, at least one ASM can have a temperature sensor and at least one unit can have a pressure sensor for wind pressure measurements.

Length of a typical highway bridge is in the range of 100-300 m, therefore, using a transmitter with 250 m range allows for a direct wireless transmission from ASMs to the base station. For large bridges multiple base stations and/or multi-hop data transmission can be used. If a base station is located at the middle of the bridge then it can serve sensors within the range of 400-500 m using direct transmission. This approach can make both the system and data transfer protocols much simpler than in case of WSN with a complex structure.

Although only one ASM is shown for each support section a larger number of sensors can be used especially when support sections have more than one post supporting the bridge.

In case of installation in the areas that can be flooded special attention should be paid to providing water-proof sealing of the ASMs.

Example of ASM Power Budget

An autonomous sensing module can be powered by two fully charged AA secondary batteries providing a voltage of 2.4 V and having an initial capacity of 1800 milliampere-hour (mAh) each. The batteries can be loosing 1% of energy per day due to natural discharge. We shall neglect variation of battery power due to level of charge and temperature variations. The ASM also has an energy harvesting device providing in average power of 8 mW. The sensing module works in active mode for up to twelve minutes per day. The active mode has two phases, phase A and phase B. During the phase A, which is ten minutes long, the sensors make measurements, controller conditions the measurement data and put the data in the non-volatile memory. The phase B can last up to two minutes. During this phase the sensors do not make measurements and controller extracts data from memory and supplies the data to the wireless data transfer unit, which transmits them out to a base station. If necessary, the whole set of data or a part of data set can be transmitted more than one time within the same two-minute time slot. This can happen if some data lost during transmission. If the first attempt of transmitting data is successful then duration of the phase B can be smaller than two minutes.

Current consumption in the first phase (when the measurements are made) is assumed to be 10 mA and current consumption in the second phase (when the data is transmitted out) is assumed to be 100 mA. During the rest of the day the sensing module consumes only 10 µA of current. Some of this consumption can be due to continuous work of the sleep-mode clock circuit.

Assuming that the average duration of the second phase is 1.5 minutes, the daily battery use has the following components:

(a) Discharge during the Phase A of active mode is equivalent to 10 mAh*(10 min/60 min)=1.67 mAh;

(b) Average discharge in the phase B is equivalent to 100 mAh*(1.5 min/60 min.)=2.5 mAh; the maximum discharge during the phase B is equivalent to: 100 mAh*(2 min./60 min.)=3.33 mAh;

(c) Discharge in the sleep mode is equivalent to 0.01 mAh*23.8 hrs=0.24 mAh;

(d) Natural battery discharge depends on the remaining capacity and can be as high as 18 mAh for the fully charged battery.

Therefore, the maximum daily discharge of the battery pack can be equal to: (1.67+3.33+0.24+2*18) mAh=41.2 mAh. The average daily battery discharge can be in the range of 7-41 mAh depending on the remaining capacity of the battery. As the supplied voltage is equal to 2.4 V, the average daily power consumption is equivalent to 2.4 V*(7 . . . 41) mAh/24 hrs=(0.7 . . . 4.1) mW.

The energy harvesting device provides an average power of 8 mW. The power management unit uses this energy to recharge the battery. The cumulative efficiency of the energy harvesting and battery charging is 30%. Therefore, the average energy flow returning back to the battery is equivalent to 2.4 mW. As it can be seen, this harvester is capable of providing an average current of 1.0 mA and compensating the average battery capacity loss on the level of 1 mAh per hour or 24 mAh per day. In the frames of the above described model, the average battery capacity loss of 5.24 mAh due to current consumption by the sensing module will be fully compensated and an additional 18.76 mAh capacity loss due to internal battery discharge also will be compensated. This means that charge of each battery will be decreasing from the initial level of 1800 mAh to a lower level and stabilized at the level. Calculations show that this stable level can be close to 940 mAh. Even if capacity of the battery will decrease much lower than the initial capacity, but it will be capable of just accepting and keeping during the day the harvested energy, it still can be enough to power up the sensing module in the active mode every day.

Another approach can be related to periodic use of the energy harvesting device starting from the point when battery charge decreases below a pre-determined level and continue charging until the battery charge will exceed another pre-determined level. This approach can be effective if the energy harvesting device can provide relatively large current. It also allows minimizing number of charging cycles for the batteries and increases their service life.

Although specific embodiments have been illustrated and described herein, this application is intended to cover any adaptations or variations of the present invention. Therefore, it is manifestly intended that this invention be limited only by the claims and the equivalents thereof.

We claim:

1. An autonomous sensing module for long-term monitoring comprising:
   a set of sensors, including at least one sensor of a physical parameter; said set of sensors generates measurement data;
   a non-volatile memory for storing measurement data provided by the set of sensors;
   a wireless communication means for transmitting the measurement data;
   at least one microcontroller connected to the set of sensors, to the non-volatile memory and to the wireless communication means; said microcontroller controls data transfer from the sensors to the non-volatile memory, from the non-volatile memory to the wireless communication means and wireless data transmission;
   a continuously powered sleep-mode clock circuit;
   a set of batteries, including at least one rechargeable battery, said set of batteries has capacity and supplies energy at least to the set of sensors, the non-volatile memory, to wireless communication means and to the sleep-mode clock circuit; said set of batteries loses power with time due to self-discharge;
   at least one energy harvesting device harvesting energy from the environment, converting it to the electrical energy and generating electrical output;

said at least one power management unit connected to said at least one battery from said set of batteries, said at least one energy harvesting device and said at least one microcontroller;

the power management unit:
conditions output voltage of at least one energy harvesting device to a form suitable for battery charging;
charges the battery using the conditioned output voltage of at least one energy harvesting device;

wherein in order to provide a long-term functionality and reliability of the autonomous sensing module:
said at least one microcontroller, the non-volatile memory, the set of batteries, the sleep-mode clock circuit and the power management unit are located in at least near hermetic packages and at least some electrical connections within the autonomous sensing module are covered by a protective layer;

the autonomous sensing module operates in active mode and in sleep mode; when operating in the active mode, the autonomous sensing module makes measurements, transfers measurement data to the non-volatile memory and transmits the data out using the wireless communication means; in the sleep mode the autonomous sensing module reduces power usage in comparison with power consumption than in the active mode; and duration of active mode periods, type and number of measurements and time intervals between active mode periods are chosen in such a way that the average discharge of the at least one rechargeable battery due to both energy consumption by the autonomous sensing module and self-discharge of the battery is fully compensated by the average energy harvesting by said at least one energy harvesting device during subsequent sleep mode periods.

2. An autonomous sensing module of claim 1 wherein the set of sensors includes at least some sensors chosen from the group of a linear accelerometer, an angular accelerometer, a microphone, a strain sensor, a stress sensor, a jointmeter, a temperature sensor, a pressure sensor, a force sensor, a gyroscope, a humidity sensor, a wind sensor, a magnetic sensor, a proximity sensor, an image sensor, a web-camera, a fiber-optic sensor, an optical sensor, a radiation sensor, an acoustic sensor, a chemical sensor, a GPS module.

3. An autonomous sensing module of claim 1 further comprising a signal conditioning hardware for conditioning raw signals of at least some sensors; the signal conditioning hardware conditions the raw signals of at least some sensors to the form of measurement data by performing at least some of the operations from the set of: amplification, temperature compensation, filtering using low-pass filter, filtering using high-pass filter, filtering using band pass filter, analog to digital conversion, analog to frequency conversion, amplitude modulation, frequency modulation, pulse width modulation, summation, multiplication, digital correction, signal correction using data from other sensors, multiplexing, assigning time stamps or combination of the above.

4. An autonomous sensing module of claim 1 wherein the wireless communication means contain at least one integrated circuit and an antenna and said at least one integrated circuit is located in at least a near hermetic package.

5. An autonomous sensing module of claim 1 wherein the energy harvesting device uses an energy transformation selected from the following list of energy transformations: energy of magnetic field to electrical energy, mechanical energy to electrical energy, energy of elastic deformation to electrical energy, energy of wind to electrical energy, energy of radiation to electrical energy, thermal energy to electrical energy, energy of a radioactive particles to electrical energy and chemical energy to electrical energy.

6. An autonomous sensing module of claim 1 wherein the power management unit conditions the electrical output of the at least one energy harvesting device by performing operations chosen from the set of: AC-DC conversion, signal conversion using a diode bridge, accumulation of harvested energy with help of a reactive element chosen from a group of a capacitor and an inductor, comparison of a voltage drop on a reactive element and output voltage of a battery and combination of the above.

7. An autonomous sensing module of claim 1 wherein at least some components of the autonomous sensing module have a self test capability.

8. An autonomous sensing module of claim 1 wherein switching of the autonomous sensing module from sleep mode to active mode is initiated by a wakeup signal chosen from a group of signals consisting of a signal generated by a sleep-mode clock circuit, a signal generated by a sensor, a signal transmitted through a wireless channel, a signal generated by the power management unit and combination of the above.

9. A system for long-term monitoring of an object comprising:
a set of autonomous sensing modules containing at least one autonomous sensing module;
the autonomous sensor modules are installed at locations chosen from a set of locations consisting of: on the monitored object, inside the monitored object, outside the monitored object, near the monitored object, under the monitored object, above the monitored object;
each autonomous sensing module comprises:
a set of sensors for measurements of parameters related to properties of the monitored object; the set of sensors generates measurement data;
a non-volatile memory for storing measurement data generated by the set of sensors;
a wireless communication means communicating with external wireless devices and transmitting the measurement data;
at least one microcontroller connected to the set of sensors, to the non-volatile memory and to the wireless communication means; said microcontroller controls data transfer from the sensors to the non-volatile memory, from the nonvolatile memory to the wireless communication means and wireless data transmission;
a set of batteries, including at last one rechargeable battery, to power the autonomous sensing module;
at least one energy harvesting device harvesting energy from the environment, converting it to the electrical energy and generating electrical output;
at least one power management unit connected to the at least one battery and to said at least one energy harvesting device; the power management unit conditions electrical output signal of said at least one energy harvesting device to the form suitable for battery charging; charges the at least one rechargeable battery using the conditioned electrical output signal;
a continuously powered sleep-mode clock circuit; a sleep-mode clock periodically generates signals switching the autonomous sensing module from sleep mode to active mode; power consumption of the autonomous sensing module in sleep mode is significantly smaller than its power consumption in active mode;

at least one base station communicating with and receiving measurement data from said at least one autonomous sensing module;

said base station transfers the measurement data to at least one data processing center;

at least one data processing center receiving data from at least one base station;

software for collection and analysis of the measurement data, including analysis of current data, analysis of historical data for the monitored object, for at least one sensing module and for at least one base station, evaluating magnitude of changes in the monitored parameters and assessing changes in the condition of the monitored objects and associated risks related to the condition and functionality of the monitored object, wherein in order to provide long-term functionality and reliability of the system for long-term monitoring of an object:

collection of the measurement data, transferring the data to data processing center and at least some data analysis is done by software and does not require human involvement;

use of batteries, energy harvesting and power management provides an average service life of the autonomous sensing modules of at least 20 years without maintenance and repair/replacement; and the malfunctioning autonomous sensing modules and base stations are identified by said software from said analysis of the measurement data.

10. A system for long-term monitoring of claim 9 wherein the monitoring object is selected from the following group of objects: a building, a bridge, a wall, a roof, a floor, stairs, a power line, a pipeline, a pipe, a levee, a dam, a pier, a part of a highway, a part of a road, a part of rail road, a tank, a well, a vehicle, an aircraft, a ship, a sea platform, a fence, a gate, a light pole, a traffic pole, a pavement, an underground structure, civil infrastructure facilities, military infrastructure facilities, a structure of historical value, a monument, a machine, a mechanism, an attraction, a bench, a tree, a plant, a group of plants, a garden, an agricultural filed, a landform, a rock, an object of nature.

11. A system for long-term monitoring of claim 9 wherein each base station is powered from a source of power chosen from the group of a power line; a phone line, a rechargeable battery, a set of batteries, an energy harvesting device and combination of the above.

12. A system for long-term monitoring of claim 9 wherein each base station has non-volatile memory capable of storing measurement data transferred from all autonomous sensing modules communicating with this base station during at least one session.

13. A system for long-term monitoring of claim 9 wherein autonomous sensing modules transfer measurement data to base stations using a data transfer method chosen from a group of methods consisting of: transferring data by direct communication between an autonomous sensing module and a base station, transferring data from an autonomous sensing module to a base station by transferring the data to at least one intermediate autonomous sensing module.

14. A system for long-term monitoring of claim 9 wherein at least one base station contains at least one sensor.

15. A system for long-term monitoring of claim 9 wherein at least some settings of at least some components of the system can be remotely changed.

16. A method of long-term monitoring of an object comprising the steps of:

selecting a set of parameters of the object for periodic measurements, and evaluation;

providing a system for long-term monitoring of an object, comprising:

a set of autonomous sensing modules; each autonomous sensor module being powered by at least one battery, at least one autonomous sensing module being equipped with at least one energy harvesting device and at least one autonomous sensing module having a power management unit; the set of autonomous sensing modules measures parameters selected for periodic measurements and generates measurement data;

at least one base station;

at least one data storing and processing center;

a software for collection and analysis of the measurement data;

deploying said set of autonomous sensing modules at locations chosen from a set of locations consisting of: on the monitoring object, inside the monitoring object, near the monitoring object, under the monitoring object, above the monitoring object;

deploying said at least one base station near the set of the autonomous sensing modules;

establishing wireless communication between the set of autonomous sensing modules and said at least one base station;

establishing communication between said at least one base station and said at least one data storing and processing center;

making measurements of parameters related to properties of the monitored object and generating measurement data with help of the set of autonomous sensing modules;

harvesting ambient energy with help of said at least one energy harvesting device for compensating of average battery energy consumption by the autonomous sensing modules;

transmitting the measurement data from the set of autonomous sensing modules to said at least base station using the established wireless communication;

transferring the measurement data from said at least one base station to said at least one data storing and processing center using the established communication;

analyzing the measurement data with help of the software; the analysis includes steps selected from the group of steps consisting of:

analysis of most recent measurement data for said at least one autonomous sensing module;

analysis of most recent measurement data for said at least one base station;

analysis of most recent measurement data for the monitored object;

evaluating the condition of said at least one autonomous sensing module based on the most recent measurement data;

evaluating the condition of said at least one base station based on the most recent measurement data;

evaluating the condition of the monitored object based on the most recent measurement data;

forming historical data for said at least one autonomous sensing module based on multiple sets of measurement data acquired by this autonomous sensing module;

forming historical data for said at least one base station based on multiple sets of measurement data collected by this base station;

forming historical data for the monitoring object based on multiple sets of measurement data collected by the system for long-term monitoring;

establishing a baseline for said at least one autonomous sensing module based on the first sets of measurement data;

establishing a baseline for said at least one base station based on the first sets of measurement data;

establishing a baseline for the monitored object based on the first sets of measurement data;

analysis of historical data for the monitored object;

analysis of historical data for said at least one autonomous sensing module;

analysis of historical data for said at least one base station;

assessing changes in condition and functionality of said at least one sensor and making decision on using data from this sensor;

assessing changes in condition and functionality of said at least one autonomous sensing module and making decision on using data from this autonomous sensing module;

evaluating changes in the parameters characterizing of the monitored object over time;

assessing changes and trends in the condition of the monitored object based on the changes in the statistical parameters obtained by processing of the measurement data;

assessing risks related to the structural stability, safety, and functionality of the monitored object;

and combination of the above steps;

evaluating results of analysis of the measurement data made by the software;

periodically generating summaries describing condition of the monitored object;

periodically generating summaries describing condition of the autonomous sensing modules, base stations and the whole system for long-term monitoring;

providing warnings and alarms based on current condition of the monitored object and assessed trends in the condition of the monitored object, wherein in order to minimize the cost of ownership of the system for long-term monitoring of an object, a combination of battery selection, energy harvesting and power management provides at least 20 years of average service life of the autonomous sensing modules without maintenance and repair/replacement;

analysis of the measurement data is provided by the software without human involvement;

periodically generated summaries describing condition of the monitored object and the system for long-term monitoring of the object, warnings and alarms related to the condition of the monitored object are automatically delivered to a pre-determined set of recipients.

17. A method of long-term monitoring of an object according to claim 16 wherein at least some of the following parameters are extracted from the measurement data and used in evaluation of structure condition: linear acceleration, resonance frequency, modes of oscillation, frequency spectrum, ratio of spectral densities corresponding to different ranges of frequencies, peak amplitude of vibration, velocity, peak velocity during oscillations, displacement, deflection, peak deflection during oscillations, ratio of amplitudes of displacement corresponding to different frequencies, ratio of amplitudes of displacement corresponding to different locations, temperature, amplitude of sound, frequency spectrum of sound, frequency band of sound, angular displacement, angular velocity, angular acceleration, stress, strain, load, light intensity, size of a defect evaluated from at least one image, size of a feature evaluated from at least one image, deviation from a reference, concentration of a pre-determined chemical, strength of magnetic field, a parameter characterizing correlation between output signals of at least two sensors, and a parameter characterizing correlation between at least two parameters extracted from the measurement data.

18. A method of long-term monitoring of an object of claim 16 wherein transmitting of the measurement data to the at least one base station is done using a format that allows error correction and the method further comprises a step of error correction after transmitting the data to at least one base station.

19. A method of long-term monitoring of an object according to claim 16 wherein analysis of the measurement data further includes steps of comparison of collected and historical data with a reference data selected from the group of data consisting of: data obtained from modeling of the monitoring object and data obtained from similar monitored objects.

20. A method of long-term monitoring of an object of claim 16 further comprising a step of a remote inspection of the monitoring object and remote activation of at least some components of the system for long-term monitoring of the object.

* * * * *